United States Patent
Hanke (10) Patent No.: US 8,688,422 B2
(45) Date of Patent: Apr. 1, 2014

(54) SYSTEM FOR MANIPULATING THREE-DIMENSIONAL IMAGES

(76) Inventor: Kimberley Hanke, Royal Oak, MI (US)

(*) Notice: Subject to any disclaimer, the term of this patent is extended or adjusted under 35 U.S.C. 154(b) by 0 days.

(21) Appl. No.: 10/573,218

(22) PCT Filed: Oct. 14, 2004

(86) PCT No.: PCT/US2004/033925
§ 371 (c)(1),
(2), (4) Date: Oct. 16, 2006

(87) PCT Pub. No.: WO2005/038708
PCT Pub. Date: Apr. 28, 2005

(65) Prior Publication Data
US 2007/0165021 A1    Jul. 19, 2007

Related U.S. Application Data (60) Provisional application No. 60/511,000, filed on Oct. 14, 2003.

(51) Int. Cl.
*G06G 7/48* (2006.01)

(52) U.S. Cl.
USPC .................................................. 703/8; 703/6

(58) Field of Classification Search
USPC ............................................. 703/2; 345/419
See application file for complete search history.

(56) References Cited

U.S. PATENT DOCUMENTS

| | | | | |
|---|---|---|---|---|
| 4,480,480 A * | 11/1984 | Scott et al. | ...................... | 73/769 |
| 4,977,529 A * | 12/1990 | Gregg et al. | ..................... | 703/18 |
| 5,474,453 A * | 12/1995 | Copperman | .................... | 434/29 |
| 5,511,157 A * | 4/1996 | Wang | ............................. | 345/652 |
| 5,617,342 A * | 4/1997 | Elazouni | ........................... | 703/6 |
| 5,950,169 A * | 9/1999 | Borghesi et al. | ................. | 705/4 |
| 6,036,345 A * | 3/2000 | Jannette et al. | .................. | 700/97 |
| 6,195,625 B1* | 2/2001 | Day et al. | ............................ | 703/7 |
| 6,230,116 B1* | 5/2001 | Ronen et al. | ..................... | 703/22 |
| 6,356,437 B1* | 3/2002 | Mitchell et al. | .......... | 361/679.03 |
| 6,536,037 B1* | 3/2003 | Guheen et al. | ................. | 717/151 |
| 6,670,908 B2* | 12/2003 | Wilson et al. | ............... | 342/26 R |
| 6,826,500 B2 | 11/2004 | Linthicum et al. | | |
| 7,158,922 B2* | 1/2007 | Sadagopan et al. | ............... | 703/2 |
| 7,231,327 B1* | 6/2007 | Beverina et al. | ................. | 703/2 |
| 7,315,826 B1* | 1/2008 | Guheen et al. | ................. | 705/7 |
| 2002/0072988 A1* | 6/2002 | Aram | ............................. | 705/26 |
| 2002/0120921 A1* | 8/2002 | Coburn et al. | ............... | 717/140 |
| 2002/0161533 A1* | 10/2002 | Uegaki | ........................... | 702/35 |
| 2003/0142097 A1* | 7/2003 | Sakagami et al. | ............. | 345/473 |
| 2004/0225390 A1* | 11/2004 | Keller et al. | ................... | 700/95 |
| 2005/0050006 A1* | 3/2005 | Zara et al. | ........................ | 707/1 |
| 2007/0005795 A1* | 1/2007 | Gonzalez | ..................... | 709/232 |
| 2008/0052054 A1* | 2/2008 | Beverina et al. | ................. | 703/6 |

\* cited by examiner

*Primary Examiner* — David Silver (57) ABSTRACT

An automated three-dimensional and related data access system, said system comprising manipulating means for virtually manipulating, testing, and controlling the three-dimensional and related data. A system for controlling and adjusting three-dimensional and related data, said system comprising manipulating means for virtually manipulating, testing, and controlling the threedimensional and related data.

15 Claims, 7 Drawing Sheets

SYSTEM FOR MANIPULATING THREE-DIMENSIONAL IMAGES

CROSS-REFERENCE TO RELATED APPLICATIONS

This is a National Phase Filing Under 35 U.S.C. 371, of International Application No. PCT/US04/33925, filed Oct. 14, 2004, which claims the benefit of priority of U.S. Provisional Patent Application Ser. No. 60/511,000, filed Oct. 14, 2003, both of which are incorporated herein by reference.

BACKGROUND OF THE INVENTION

1. Field of the Invention

Generally, the present invention relates to systems for generating three-dimensional images that are capable of being tested, manipulated and interrogated. More specifically, the present invention relates to the deployment of information produced by multiple softwares that generate three-dimensional images that are capable of being tested, manipulated interrogated.

2. Description of Related Art

In many manufacturing systems today, computers are used throughout the system to aid in the design and manufacture of components, sub-assemblies and major assemblies. Computer-aided design (CAD) systems help component designers prepare drawings, specifications, parts lists, and other design-related elements using computer programs that are graphic and calculation intensive. In modern CAD systems, end products are designed by geometrically modeling the component in three-dimensions (3D) with a CAD computer program to obtain a component definition for the components, sub-assemblies and major assemblies.

Designing and developing complex 3D CAD models for many modern end products is a powerful but expensive and intricate process. In the manufacturing industry, component performance and design constraints are balanced against manufacturing capability and cost. Manufacturers expend large amounts of effort and resources balancing these issues. A key product of this enterprise wide effort is the 3D CAD models of the components, sub-assemblies, and major assemblies including their respective predefined dimensional tolerances. The bulk of the manufacturing and assembly process revolves around efficiently achieving the constraints defined in and between CAD models of the components and assemblies.

Currently, manufacturers expend a significant percentage of their resources to develop and refine 3D CAD models for each component and assembly. Engineers must then create two-dimensional (2D) drawings to detail, including dimension and tolerance component features and assembly configurations. This process generates a significant duplication of effort because a series of 2D perspectives of the components have to be created and, thereafter, the tolerances have to be assigned and detailed on a 2D drawing.

A significant drawback with the 2D perspectives is that 2D drawings do not enable an individual to obtain an accurate view of the part. Further, the drawings are static. In other words, the drawings cannot be altered or manipulated from the drawn state. It would be beneficial to develop a 3D manipulative system that replaces the current 2D drawing system.

SUMMARY OF THE INVENTION

According to the present invention, there is provided an automated three-dimensional and related data access system, said system comprising manipulating means for virtually manipulating, testing, and controlling the three-dimensional and related data. A system for controlling and adjusting three-dimensional and related data, said system comprising manipulating means for virtually manipulating, testing, and controlling the three-dimensional and related data.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
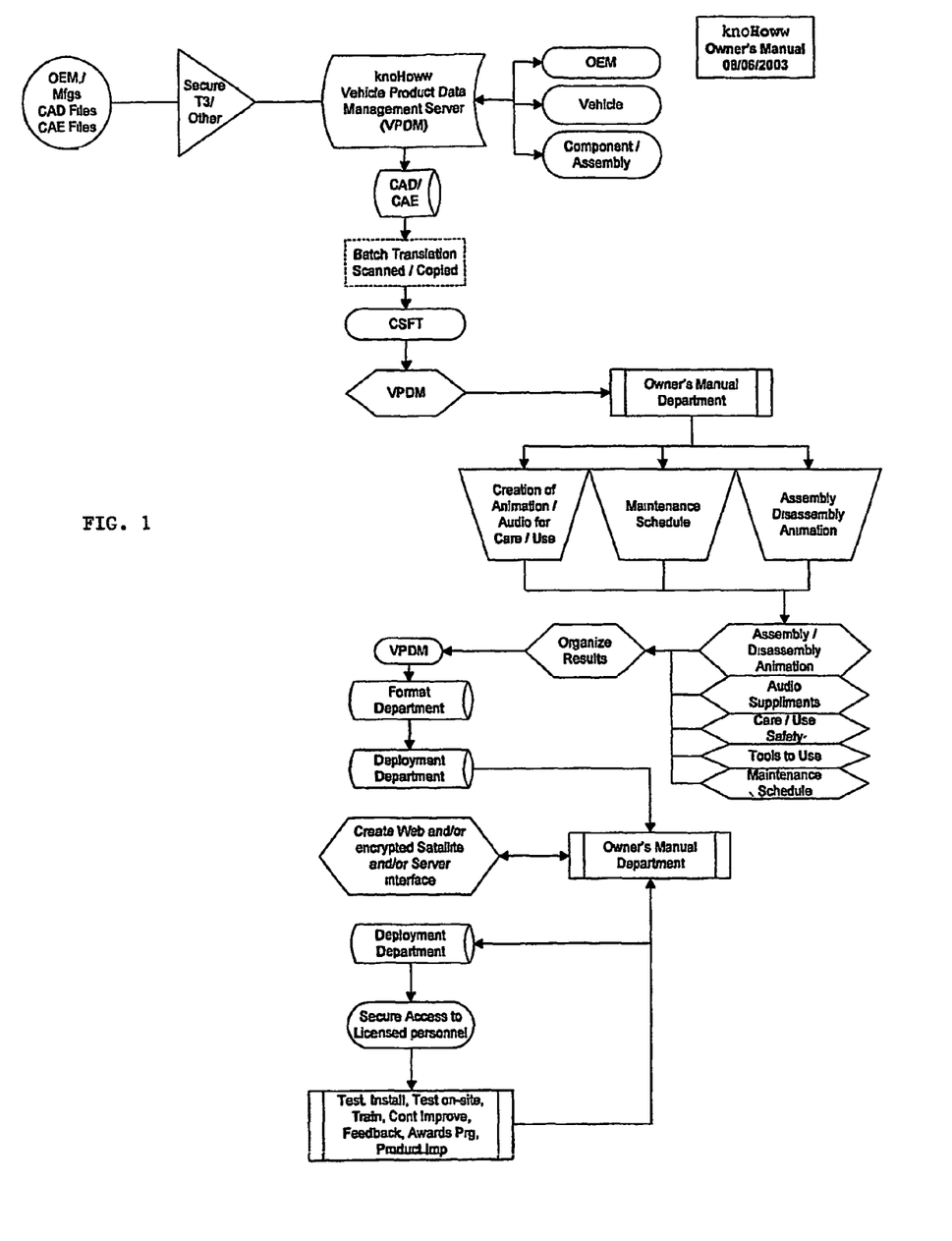
FIG. 1 is a flow chart showing the flow of data for the present invention when the invention is used for an owner's manual.
Figure 2:
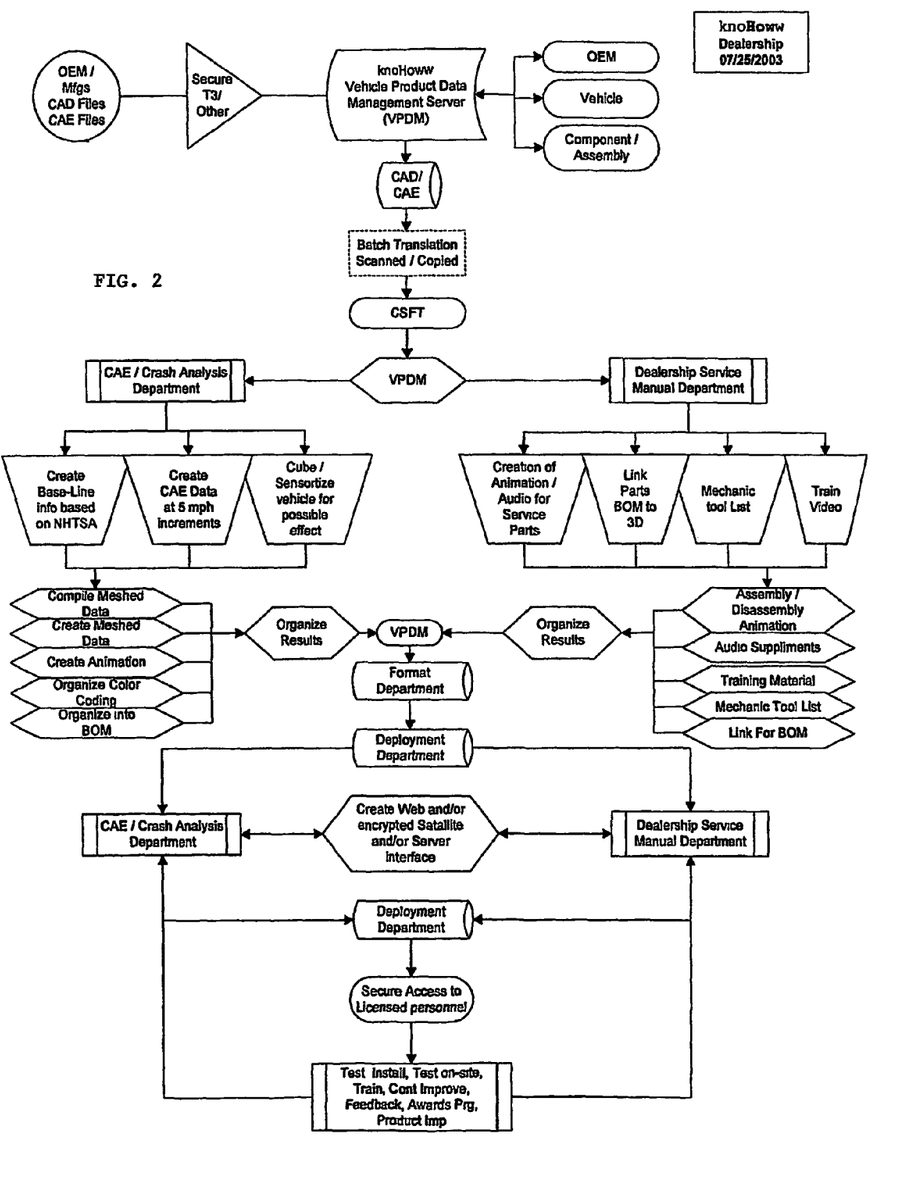
FIG. 2 is a flow chart showing the flow of data for the present invention when the invention is used for use in repair shop.
Figure 3:
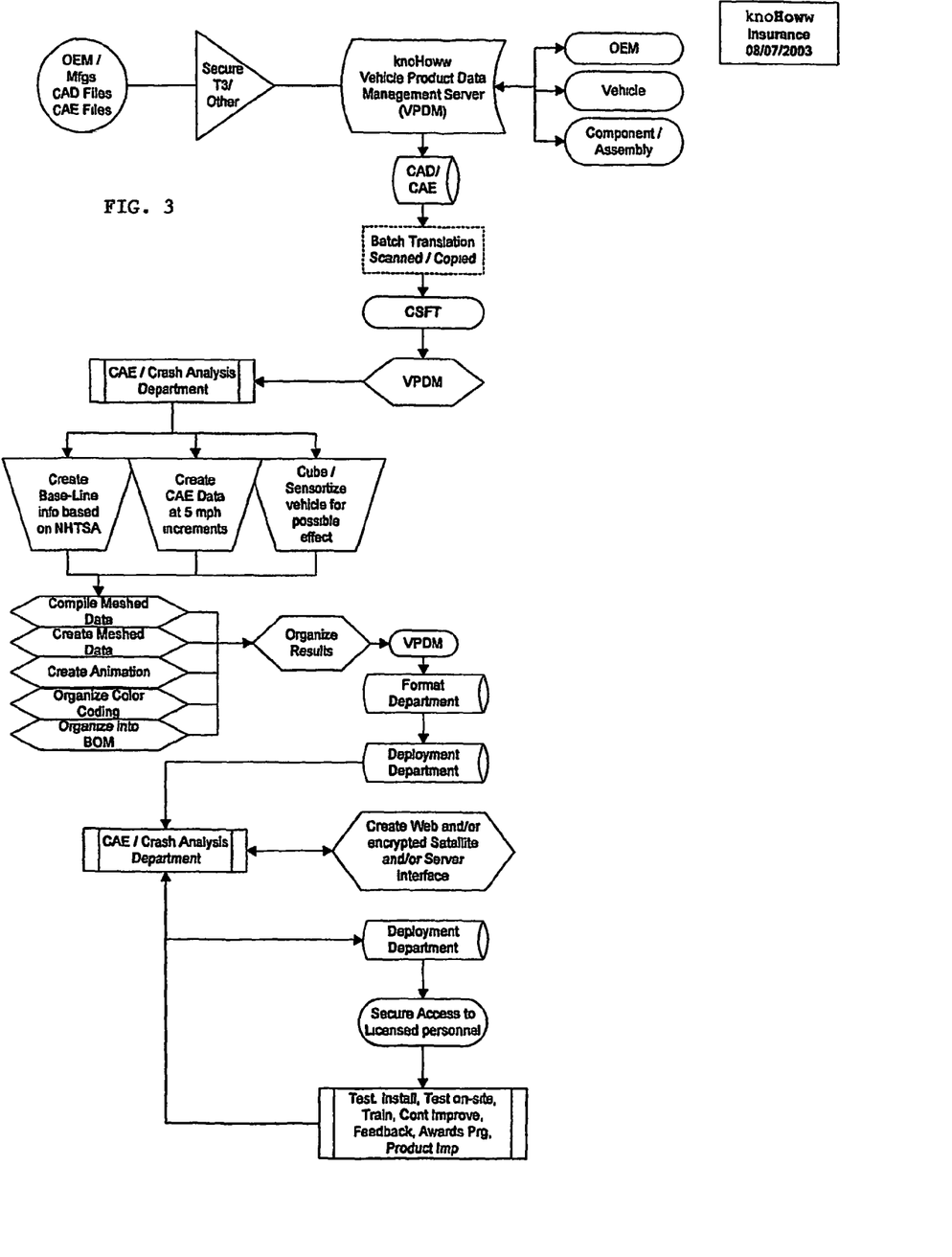
FIG. 3 is a flow chart showing the flow of data for the present invention when the invention is used for insurance purposes.
Figure 4:
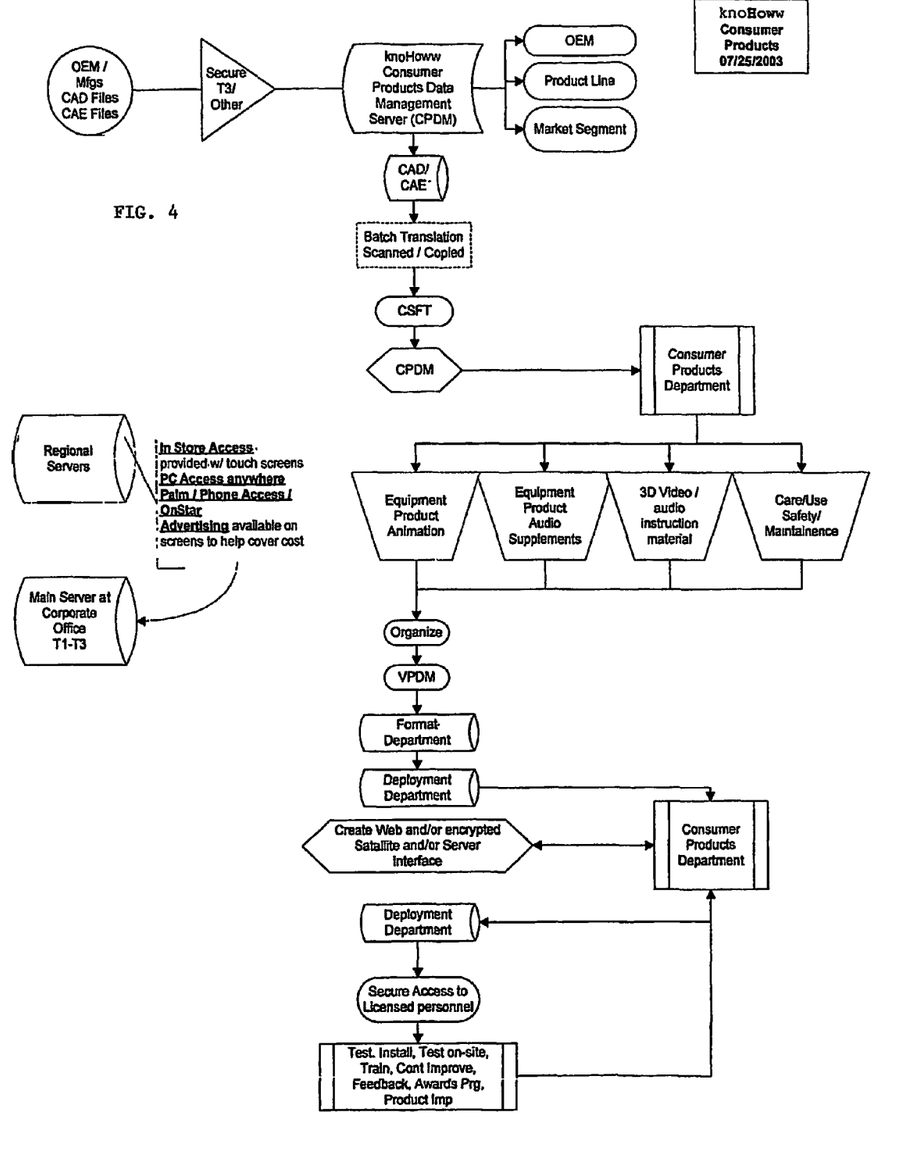
FIG. 4 is a flow chart showing the flow of data for the present invention when the invention is used for consumer products.
Figure 5:
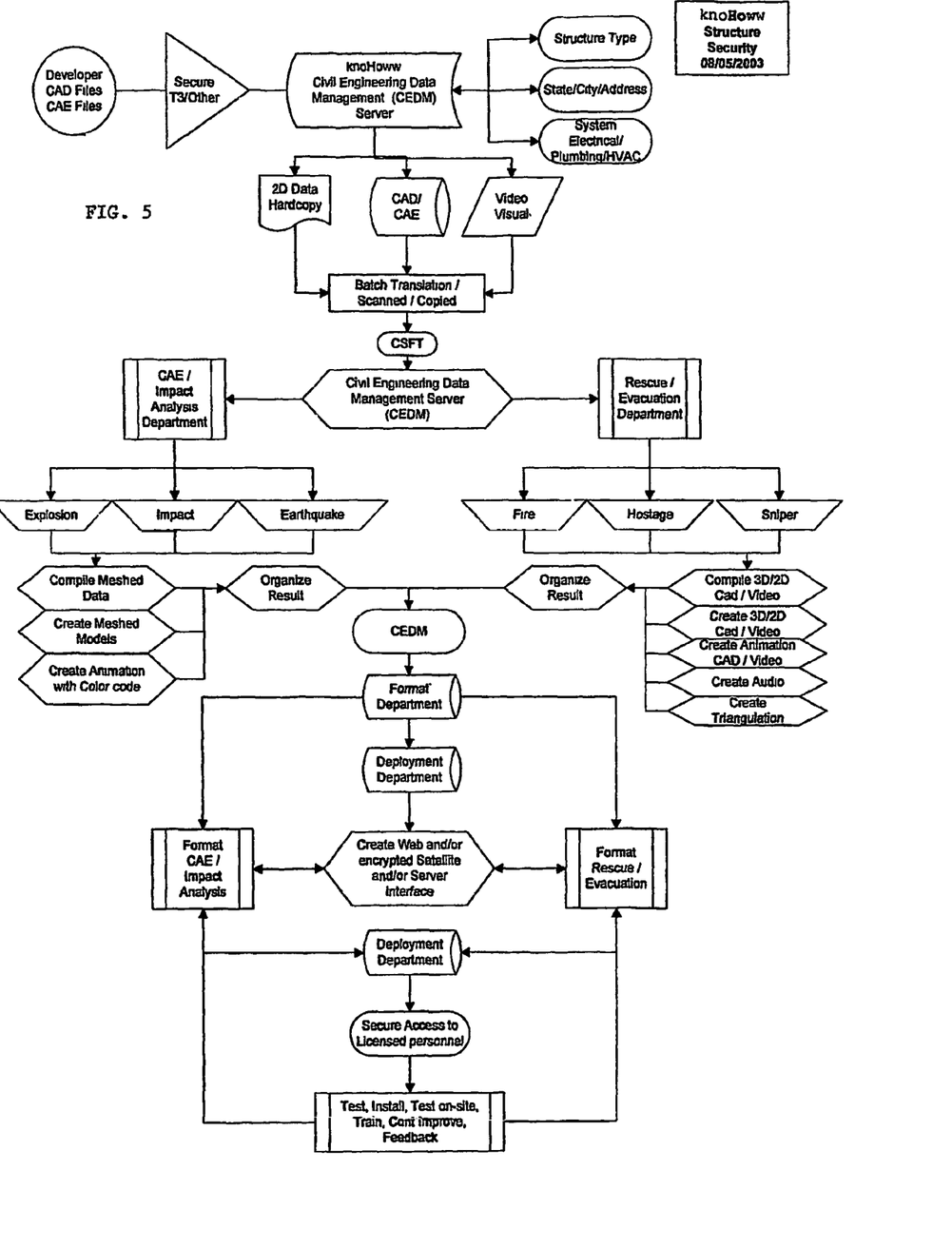
FIG. 5 is a flow chart showing the flow of data for the present invention when the invention is used for security/safety.

Generally, the present invention provides a system for virtually manipulating three-dimensional models, the system includes a manipulating device for manipulating and testing the three-dimensional models. The manipulating device is preferably software that is capable of rendering a three-dimensional image of the object and manipulating the object.

The term "models" as used herein includes, but is not limited to, physical depictions of objects and any data associated therewith. In other words, the models can be three-dimensional representations of objects or the dimensions and product specifications of the objects. The models are preferably in the Corporate Standard File Type (CSFT) format. However, other programs can be used for displaying and creating the models. Examples of such programs include, but are not limited to, CATIA™, Unigraphics™, I-Deas™, AutoCAD™, desk Products™, Pro-Engineer™, Solid Works™, Allias™, Mya™, Alibra™, TogoCAD™, CAD II™, and CAE software including, but not limited to, Nastran™, Hyermesh™, CATIA™, LS-Dyna™; AlGore™, Ani™, Fire™, and Enovia™. When the model is not in CSFT format, the file is translated to CSFT format using any known translation software as are known to individuals of skill in the art. Further, if a depiction of the object is not available, the object can be scanned or otherwise modified such that a digital, holographic or photogramic image of the object can be entered into the system.

The phrase "to manipulate and test" as used herein is defined as, but is not limited to, altering the object (model) to determine damage that can be incurred (i.e. assembling, crash testing, impact testing, fire test, bomb testing, etc.), dissecting (i.e. removing parts of the object to view other parts located behind the removed parts), rotating the object, and simulating and viewing damage causing activities such as those disclosed above. This function can create virtual conditions such as impact to a vehicle, destruction of a building, assembly/ disassembly, etc. It virtually depicts a primary or secondary cause and its' effect on structure.

3D animation is utilized to manipulate the models. Many programs are known to those of skill in the art for creating 3D animation. Examples of such programs include, but are not limited to, Allias™, Mya™, Kaon™, Alebra™, Actify™, Spinfire™, and Visvu™. In conjunction with the animation software, audio software can be used. The audio software must be compatible with the animation software. Examples of audio software include, but are not limited to, Quicktime™, Mediaplayer™, and Realplayer™.

The system can include a web and/or encrypted satellite and/or server interface and/or existing system structured as follows for each structure. The secure website/satellite is created that is accessible to licensed users. The website is entered with a login and password. The website includes a variety of viewing equipment types including, but not limited to on-board computer (i.e. ONSTAR™), PDAs, phones (both cell and land line), touch screen monitors, and viewable glasses. The system can therefore be accessed using phone lines, modem, TI line, Internet, DSL, cable modem, dial-up Internet, wide area network, Intranet, local area network, ISDN, wireless connections, satellite communications, direct cable connection, T3 communications, or other similar connections known to those of skill in the art.

The system of the present invention can be activated by a one-time fee that grants the consumer access to the compiled information. An annual fee is required for updates and access. Alternatively, the consumer can pay a monthly fee for use of the system or pay a fee per use of the system. The information can be provided to the companies or the consumer through login access via any browser, such as, but not limited to, Explorer™, Netscape™, and Safari™. The information can also be obtained in hard copy or on a DVD/CD. However, the information can be maintained on a secure site remote from the consumer.

The system can also include a device for estimating accident damage, structural integrity, or likelihood of recovery. In an automotive environment, this device, preferably software, can predict damage caused during an accident; and determine costs for repairing parts damaged during the accident. Preferably, the predicting device includes warning indicia that indicate parts that are destroyed as a result of the accident. The warning indicia are as follows: red, indicating a 100%-75% probability of chance of structural failure; blue, indicating a 75%-50% probability of same; yellow, indicating a 50%-25% probability of same; and green, indicating a 0% probability of same.

The system can also include an order device that can automatically order the damaged parts. The order device enables the damaged parts to be ordered immediately, thereby limiting the amount of time required for repair of the damage. The ordering device is preferably software that can automatically order the damaged parts.

The present invention can be used in conjunction with a number of services to support the automotive, aerospace, commercial and industrial industries. For example, the system of the present invention can be used for manufactured assemblies (i.e. off road equipment, heavy equipment, appliances, fixtures, boats, recreational vehicles, phones, computers, military vehicle and equipment, etc.).

The system of the present invention can be used for numerous applications including High Level Security and Safety. For Security, every department of the government including FBI, CIA, ATF, Police State and Local and Fire can have laptops that are connected to a remote server containing downloadable encrypted information including, but not limited to, 3D images. The 3D images can be images of a building or structure such that the individuals can view the floor layouts, electrical, heating & cooling systems, in order to plan, predict, avoid or react to an attack/emergency or view possible rescue routes.

For example, worst-case scenarios can be tested through crash simulations to evaluate how long a building or bridge can stand after an attack. The system can then estimate what areas are damaged from the ground and help predict when and where structural failure can occur and if the rescue is needed to be from above or below base on predicted structural integrity.

For a service station, such as those at automotive dealerships, the system of the present invention provides images of the complete vehicle, wherein users merely need to point and click on a specific part of a vehicle in order to view subassemblies. The user is able to select the assembly and get the part numbers, part names and order information. The user is also able to review crash simulation that highlights the effected areas of the vehicle. The crash simulation can be used in conjunction with government required testing such that parts that have failed are displayed in red (to be replaced 100% of the time), parts that need to be physically inspected are displayed in blue and yellow, parts displayed in green do not need to be replaced. The parts that are flagged in blue and yellow can have an accompanying check off and acceptance sheet within the program that can be accepted and electronically signed of by the service manager and customer.

The viewing capabilities can also assist the service department in locating possible squeak and rattle conditions that have always been very difficult to identify. Now with the ability to view the models using the system of the present invention the service department is able to identify parts that are located behind other parts. With the customer's input of the area where a squeak or rattle is coming from, there is a reduction in the amount of time of required to identify the problematic part.

For this particular use, dealerships are provided with mini computer servers with desktop computers and mini notebooks or touch screen access that are secure and that can only operate the programs required for use with the system of the present invention. New updates to the system can be loaded on these computers by staff responsible for system maintenance. The mini servers hold the 3D information of the vehicles that the dealership inventories. Mini notebooks can be set up on a wireless support network with in the building to enable the user to pull information right at the side of the vehicle. The mini-note books can also serve as a service suggestion retrieval system for receipt of suggestions for product improvement, process improvement, design and engineering concerns and cost saving ideas.

The system of the present invention can also be used for the insurance industry. A common problem in the insurance industry, for insurance companies is fraud. A concern of the consumer is the cost of insurance and length of time that it takes to get their vehicle back after an accident. The system of the present invention prevents fraud and ensures that the consumer has a loss of their vehicle for the shortest amount of time necessary.

The evaluation of an accident is already captured at the OEM level; the information is used for product improvement material reduction and the assembly configuration to be optimized prior to production release. The government requires that certain evaluations of impacts are simulated or physically performed. The system of the present invention utilizes this information to enable insurance companies to have access to the accident information. For example, after an accident an insurance agent can input into the system the specific details of the accident. Since the system has information regarding the results of every vehicle with 8 to 12 accident configurations at different rates of speed, the insurance agent can key in the accident details and then produce an estimate of probable parts and assemblies that have to be replaced. The system can then trigger the approval to order the components and have the components in route to the dealership or repair shop at any location. The system can identify if the parts are available at the repair shop that the vehicle is going to and make the approved purchase or the part that are not in stock. The system can also generate and produce a list of components available for the dealership reducing the time that it takes for the physical review of damaged parts. Thus, the benefit of the system is a reduction in the amount of time, cost and paper duplication required subsequent to an accident. The agent can access the system through a wireless connection. Preferably, the system includes every possible permutation of an accident, broken down into 12 square inch zones of impact for different rates of speed that can be input through a police report, consumer or insurance agent.

The system can also be used by a consumer at the point of purchase of a product. When a consumer purchases an item the consumer can be given a logon identification and password to access the assembly configuration of the product that they have purchased or a video review of how to use the product correctly and more efficiently. This information can be viewed through an in-vehicle system, computer, palm, cellular phone or DVD. This information is viewable in 3D with instructions and rotational and zoom options. The assembly instruction is interactive and can be fast forwarded or captured in any view as a still image and therefore the consumer can get the product assembled quicker and with less frustration. For example, the system of the present invention can be used for everything from putting training wheels on a bike to hooking up a home entertainment system and assembling modular furniture.

The invention is further described in detail by reference to the following examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

EXAMPLES

Example 1

Consumer Products Process Description

The consumer products system functions as follows. First, 3D data is transferred from the OEM to a server owned and maintained by Applicants. The data can be transferred through direct T3 connection, or any other connection known to those of skill in the art. The data is preferably CAD data, however the data can also be scanned data, video, images, camera-ready art, or drawings. If the data is not in Corporate Standard File Type (CSFT) the data is translated into CSFT upon receipt from the OEM. The translation to CSFT can be performed by batch processing translators.

Once the data is received, the data is stored and organized in the Consumer Product Data Management (CPDM) server. The data can be organized in any manner. For example, the data can be organized per OEM, per Product Line, or per market segment (i.e. infant, toddler, 5-12, teenager, young adult, adult, senior). The stored data is accessible to the end user.

The system either obtains or generates 3D animations and videos, using CAD models/data supplied by OEM or photography, with audio supplements of all area's components, maintenance schedules, owner's care and use of equipment/product. Each product animation demonstrates the owner's care, use, and assembly process of the product. For example, adding training wheels to a bike, setting up the wiring for the entertainment center, or assembling a grill. The animation can be created with CSFT data or with photography.

Additionally, the system can include a maintenance schedules link. This can include suggested safety precautions and generally care process link such as: unplug equipment before attaching wires to back of product; clean filter on a regular basis; and air pressure in the tires of the product.

All of the above information can be accessed via a web served interface and is contained on a secure main server that can be accessed by the owner/owners of the product. When the product is purchased the owner can be provided with a login and password to access the owner's manual information. The web interface is structured as follows for each product. A secure website is accessible to licensed users using a login and password. A 3D visual image, with rotation and zooming ability controlled by user, for each product user has access to can be viewed by the user. When the product is a vehicle the user controlled 3D visual image has the following selectable zones: powertrain; electrical; chassis; steering; exterior; interior; brakes; and fuel system. Upper level selectable service zones are organized into sub-level user controlled 3D visual images where the user selects the specific serviceable component by name or using the 3D visual image. Each serviceable component is manipulated with a web-based 3D viewer where owner's care and use of standard equipment and optional aftermarket equipment animations/audio supplements, owner serviceable component options process 3D audio/video instruction materials, maintenance schedules link, and suggested safety precautions and accident process links generated by the system to corresponding OEM provided instruction of proper use of vehicle equipment.

Example 2

Structure Security Process Description

The structure security system functions as follows. 3D CAD/CAE data, visual/video, drawings, electrical, HVAC, plumbing schematics, all 2D data, hard copy information (Data) is transferred from the Approved Civil Engineering Source (ACES) or other party in possession of such data to the system of the present invention. The data is transferred through direct T3 or other connection or media. The ACES data can be translated to Corporate Standard File Type (CSFT) if CSFT format is not provided by ACES. Translation to CSFT is performed on batch processing translators. For example, 2D data and hard copy information can be scanned or copied and stored in CSFT and visual/video information is copied and stored in CSFT.

The CAD data is stored and organized in a server. Data can be organized by structure type (building, bridge, tunnel, etc.), by state, city and address; or by systems (i.e. electrical, plumbing, or HVAC).

Once the data is stored and organized, the CSFT ACES data is further analyzed and manipulated for CAE/impact analysis, rescue/evacuation analysis, and information deployment analysis.

CAE/Impact Analysis

The CAE/impact analysis manipulation generates data regarding structural integrity of a structure based upon a variety of circumstances/events. The analysis enables a prediction of the outcome of a particular event that can occur. The events include, but are not limited to, explosions, impacts and earthquakes. The information output from this analysis is accessible by emergency personnel at the disaster site and the headquarters through satellite feed and on site computers. This information allows the emergency personnel to predict the results of a disaster to a building before it happens or the effects to the building after the disaster. This information can also be used to predict the rescue and evacuations routes and also casualty and survival rates used with color codes for severity ranking.

The analysis is accomplished because the system retrieves the CSFT of the ACES provided data from the system CEDM. CAE/impact department compiles all meshed data received from the ACES and mesh any structure/s that were not provided by the ACES, in order to build a CAE model for all impact scenarios on a per structure/per event basis.

CAE manipulation runs various impact scenarios on meshed structure models. The results of this information can assist rescue personnel with the determination of severity/urgency along with the ability to evaluate the structure from the ground to determine what type of rescue to attempt, be it internal, external, ground, air or water rescue. For example the system analyzes explosions (i.e. basement, structurally attached, car/truck bomb, suicide bomber), impact (i.e. plane, missile, meteor), and earthquake (i.e. magnitude 3-8, epicenter determination).

Along with the standard impact scenarios that are created for each corner of the structure, each mid point of the structure in the vertical direction basement to roof and floor by floor mid point and joining levels in the horizontal direction or 12 foot increments in the vertical direction for non buildings. The CAE/impact manipulations also divide the CAE/impact model into 100 ft×100 ft zones in order to capture more scenarios. The divided models can be used to develop zones where computerized sensors can ultimately be placed in the structure to generate the results listed above.

CAE/impact manipulations create animations of each prediction/disaster scenario with the 3D models. Affected areas of the structures are color coded by severity of damage. Color-coding can be reflective of the sample below wherein: RED—0%-25% probability of chance of rescue, evacuation; BLUE—25% probability of same; YELLOW—50% probability of same; and GREEN—75%-100% probability of same.

The system can process and organize the results of impact animations by type and zone of disaster scenarios in the CEDM. The results can be categorized according to the color-coded results provided by each impact analysis. The results can also be categorized by type of structure, State, City and Address.

Rescue/Evacuation Analysis

The Rescue/Evacuation (R&E) manipulation functions to generate 3D animations and videos using Data supplied by the ACES, with audio supplements of all structures. Each structure's animation demonstrates the layout of fire, hostage and sniper scenarios and offers options for the safest entry for rescue, evacuation base on probabilities. This data can be supplied in the form of CAD models, drawing, video and photography. When the data supplied does not exist in 3D it can be created and entered into the system. Training videos can also be created for the training use of emergency personnel.

R&E analysis retrieves the CSFT of ACES data from the system CEDM. R&E compiles all ACES supplied information and creates any 3D CAD/Video that was not provided by ACES, in order to create proper 3D CAD/Video representation of the structures, both internal and external, create 2D floor layouts of HVAC, electrical, plumbing and roof. Video is also created that shows the view of surrounding structures from the target structure or visa/versa.

R&E runs various R&E scenarios on 3D/Video structure models. The results of this information can assist rescue personnel with the determination of severity/urgency along with the ability to evaluate the structure from the ground to determine what type of rescue to attempt, be it internal, external, ground, air or water rescue. In the case of a Sniper scenario the 3D/Video structure models are used to create triangulation results models to pin point the sniper location.

For example for fire the system provides location of the fire, probable travel route of fire, travel route of people for rescue and evacuation, and head count link through access badges (outside system).

For a hostage situation, the system provides information with regard to the location of the hostage, a rescue and evacuation plan, and a head count link through access badges (outside system).

R&E manipulation processes and organizes the results of R&E 3D CAD/Video animations by type and zone of crisis scenarios in the system CEDM. The results are categorized according to Fire, Hostage and Sniper results provided by each R&E analysis. The results are also categorized by type of structure, State, City and Address. Touch screen availability can be created to map plans and feed information to the rescue personnel at the seen. This information is viewable to the rescue personnel through mini computer or viewable glasses to receive information as it is developing.

Information Deployment Analysis

The analysis along with specifications provided by the ACES is stored into a web served interface or encrypted satellite interface that is accessed by police, fireman, and other governmental departments and personnel.

Formatting of CAE/Impact Analysis Results

Information Deployment retrieves color-coded animations created by CAE/impact of each prediction/crash scenario from the system CEDM.

Information Deployment creates a web and/or encrypted satellite and/or server interface and/or existing system structured as follows for each structure. A secure website/satellite is created that is accessible to licensed users. The website is entered with a login and password. The website includes a variety of viewing equipment types including, but not limited to on-board computer (i.e. ONSTAR™), PDAs, phones (both cell and land line), and viewable glasses. Systems can be updated at the shift change of emergency personnel. Additionally, global positioning systems can be used to down load data into 1 block up to 10 block scenarios.

The website includes 3D visual images, with rotation and zooming ability controlled by user, for each structure to which user has access. User controlled 3D visual image has the following selectable impact zones: (The area of the impact is selected on the actual structure image) each corner of the structure vertical floor by floor from basement to roof or by 12 foot increments in a vertical direction; each mid section vertical floor by floor from basement to roof or by 12 foot increments in a vertical direction for non buildings; each floor by floor mid point and joining levels in the horizontal direction. Additionally, each structure has the following selectable type of impact: explosion, impact, and earthquake. Each selectable scenario shows impact analysis animation resulting in color-coded probability of Rescue/Evacuation and Survival/Casualty.

All of the system-formatted information is contained on the system's main server and accessed by City's, State's, Government offices that have obtained this service.

Example 3

Dealership Service Manual Process Description
Data Retrieval and Organization

The Service Manual functions as follows. First, 3D CAD and CAE data is transferred from OEM. CAD, CAE, and Component Specification Data are transferred through direct T3 connection, or other known connections from OEM. OEM, CAD, and CAE data stored and organized in the system's Vehicle Product Data Management (VPDM) server. OEM CAD and CAE data translated to the system Corporate Standard File Type (CSFT) if CSFT is not provide by OEM. The translation to CSFT can be performed on batch processing translators. CAD and CAE data can be organized in any manner. For example the information can be organized per OEM, per vehicle, or per serviceable component sub-assembly.

Once the information is organized and stored the CSFT OEM CAD and CAE data is accessible for the system Data Creation Departments: CAE Crash Analysis; Dealership Service Manual; and Information Deployment.

CAE Crash Analysis

The CAE Crash Analysis functions to generate a database of affected components of a vehicle, at predetermined crash speeds and crash zones. The information output from this analysis can be accessible at the dealership service department to ensure all stressed areas of a crashed vehicle are considered in the repair. This information allows the dealership to have an instant bill of materials (BOM) for all parts affected, and allows direct ordering of parts to be replaced.

CAE Crash analysis retrieves the CSFT of OEM provided CAE data from the system VPDM. CAE department compiles all meshed data received from OEM and meshes any components that were not provided by OEM, in order to build a CAE model for all crash tests an a per vehicle basis.

CAE Crash analysis runs crash tests on CAE meshed vehicle models in the following areas of the vehicle at 5 mph increments starting at 5 mph and ending at 100 mph: Front End Collision; Right Front End Collision; Left Front End Collision; Right Side Collision; Left Side Collision; Rear End Collision; Left Rear End Collision; and Right Rear End Collision. Along with the standard crash tests above, the CAE department can develop a method to divide the CAE meshed models into 1 ft×1 ft squares in order to capture every crash angle and scenario of the vehicle. The divided models can be used to develop crash zones where computerized sensors can be installed in the vehicle.

CAE Crash analysis creates animations of each crash scenario with the 3D CAE models. Affected parts are color coded by severity of damage. Color-coding is reflective of the following: RED—100% probability of replacement; BLUE—75% probability of replacement; YELLOW—50% probability of replacement; GREEN—0%-25% probability of replacement.

CAE Crash analysis processes and organizes results into a bill of materials containing all affected parts per crash. The bill of materials can be categorized according to the color-coded results provided by the crash analysis.

CAE Crash analysis stores all CAE animations and BOM information in the system VDPM, where the information is accessible to the system Information Deployment.

Service Information Development

The Service Information Development functions to generate 3D animations and videos, using CAD models supplied by OEM or photography, with audio supplements of all serviceable components and service processes of the vehicle. Each serviceable component's animation demonstrates the disassembly and assembly of the item. Animation can be created with CSFT CAD data or with photography. Training videos and mechanic tool lists are also generated for each service process such as: oil change, recharging AC units, etc.

Service Information Development retrieves the CSFT of OEM provided serviceable components or component sub-assemblies CAD data from the system VPDM and generates a BOM for all serviceable components. Service Information Development generates a Mechanic Tools Needed List for mechanic working on each serviceable component and service process.

Information Deployment

The Information Deployment functions to format the information generated by the CAE Crash Analysis and the Service Information Development, along with specifications provide by the OEM into a web served interface that is accessed by service technicians, mechanics, body shops, and parts ordering divisions of ail automotive dealerships.

Formatting of Crash Analysis Results

Information Deployment retrieves color-coded animations of each crash scenario and BOM information from the system VPDM and creates a web interface structured as follows for each vehicle. The secure website is accessible to licensed users. The website is only entered with a login and password. The website contains a 3D visual image, with rotation and zooming ability controlled by user, for each vehicle to which user has access. The user controlled 3D visual image has the following selectable crash zones: (The area of the crash is selected on the actual vehicle image.) Front End Collision, Right Front End Collision, Left Front End Collision, Right Side Collision, Left Side Collision, Rear End Collision, Left Rear End Collision, Right Rear End Collision. Each crash zone has the following selectable mph configurations of crash: 5 mph increments starting at 5 mph and ending at 100 mph. Each selectable mph configuration shows crash analysis animation resulting in color-coded components showing probability of damage and BOM of affected components. BOM of affected components is linked directly to cost and direct ordering system. Direct ordering system generates exact cost for all damaged parts and shipping and manufacturer information. Further, user controlled 3D visual image has the following top-level selectable vehicle service zones: (The service area is selected on the actual vehicle image.) Powertrain, Electrical, Chassis, Steering, Exterior, Interior, Brakes, Fuel System. Upper level selectable service zones are organized into sub-level user controlled 3D visual images where the user selects the specific serviceable component by name or using the 3D visual image. Each serviceable component is manipulated with a web-based 3D viewer where Assembly/disassembly animations, Assembly/disassembly audio supplements, BOM information, Mechanic Tool Lists, and OEM component specifications are accessible. BOM information is linked directly to cost and direct ordering system. Selecting the actual service process from a list activates each Service process 3D audio/video.

Formatting of Service Information

Information Deployment retrieves Assembly/disassembly animations, Assembly/disassembly audio supplements, service process 3D audio/video training materials, BOM information, and Mechanic Tool Lists generated by the Service Information Development, along with OEM supplied component specification data from the system VPDM.

Information Deployment links the corresponding serviceable component 3D assembly/disassembly animations, assembly/disassembly audio supplements, BOM information, and Mechanic Tool Lists generated by the Service Information Development to corresponding OEM provided 2D or 3D component specifications (i.e. torque specs). Additionally, the Information Deployment links corresponding Service Information Development generated Service process 3D audio/video training materials and Mechanic Tool Lists.

Deployment of Formatted Information

All system-formatted information is contained on the system's main server and accessed by automotive dealerships that purchase the system.

Example 4

Insurance Company Process Description

The Insurance Process functions as follows. 3D CAD and CAE data is transferred from OEM to the system. CAD, CAE, and Component Specification Data is transferred through direct T3/or other connection from OEM to the system. OEM CAD and CAE data is translated to the system's Corporate Standard File Type (CSFT) if CSFT is not provide by OEM. Translation to CSFT can be performed on batch processing translators. OEM CAD and CAE data is stored and organized in the system Vehicle Product Data Management (VPDM) server. CAD and CAE data can be organized in any manner necessary. For example, the data can be organized per OEM, per vehicle, or per serviceable component sub-assembly.

Once CSFT OEM CAD and CAE data is organized and stored the data is accessible for the system Data Creation Departments: CAE Crash Analysis; Dealership Service Manual; and Information Deployment.

CAE Crash Analysis

The CAE Crash Analysis functions to generate a database of affected components of a vehicle, at predetermined crash speeds and crash zones. The information output from this analysis is accessible by the insurance company and at the dealership service department to ensure all stressed areas of a crashed vehicle are considered in the repair. This information allows the insurance company and dealership to have an instant bill of materials (BOM) for all parts affected, cost per part and allows direct ordering of parts to be replaced.

CAE Crash analysis retrieves the CSFT of OEM provided CAE data from the system VPDM. CAE Crash analysis compiles all meshed data received from OEM and meshes any components that were not provided by OEM, in order to build a CAE model for all crash tests on a per vehicle basis. CAE Crash analysis runs crash tests on CAE meshed vehicle models in the following areas of the vehicle at 5 mph increments starting at 5 mph and ending at 100 mph: Front End Collision; Right Front End Collision; Left Front End Collision; Right Side Collision; Left Side Collision; Rear End Collision; Left Rear End Collision; and Right Rear End Collision Along with the standard crash tests above, the CAE department develops a method to divide the CAE meshed models into 1 ft×1 ft squares in order to capture every crash angle and scenario of the vehicle. The divided models can be used to develop crash zones where computerized sensors can be installed in the vehicle. CAE Crash analysis creates animations of each crash scenario with the 3D CAE models. Affected parts are color coded by severity of damage. Color-coding is reflective of the sample below: RED—100% probability of replacement; BLUE—75% probability of replacement; YELLOW—50% probability of replacement; and GREEN—0%-25% probability of replacement.

CAE Crash analysis processes and organizes results into a bill of materials containing all affected parts per crash. The bill of materials can be categorized according to the color-coded results provided by the crash analysis. CAE Crash analysis stores all CAE animations and BOM information in the system VDPM, where the data can be accessible to the system Information Deployment.

Information Deployment

The Information Deployment functions to format the information generated by the CAE Crash Analysis and the Service Information Development, along with specificatios provide by the OEM into a web served interface that is accessed by service technicians, mechanics, body shops, and parts ordering divisions of all automotive dealerships.

Formatting of Crash Analysis Results

Information Deployment retrieves color-coded animations of each crash scenario and BOM information from the system VPDM. Information Deployment creates a web interface structured as follows for each vehicle: The secure website is accessible to licensed users. The website is only entered with a login and password. The website contains a 3D visual image, with rotation and zooming ability controlled by user, for each vehicle user has access to. The user controlled 3D visual image has the following selectable crash zones: (The area of the crash is selected on the actual vehicle image.) Front End Collision; Right Front End Collision; Left Front End Collision; Right Side Collision; Left Side Collision; Rear End Collision; Left Rear End Collision; and Right Rear End Collision. Each crash zone has the following selectable mph configurations of crash: 5 mph increments starting at 5 mph and ending at 100 mph. Each selectable mph configuration shows crash analysis animation resulting in color-coded components showing probability of damage and BOM of affected components. BOM of affected components is linked directly to a cost and direct ordering system.

The direct ordering system generates exact cost for all damaged parts and shipping and manufacturer information. The animated crash information for insurance companies can also be used to set the STAR rating for each vehicle in the future.

All system-formatted information is contained on the system's main server and accessed by Insurance Companies that purchase the system.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A method comprising:
   storing in memory a plurality of impact simulations for a vehicle and a plurality of instructions for assembling and disassembling a component of the vehicle;

displaying a three-dimensional (3D) image of the vehicle using an electronic display;

identifying one of a plurality of impact zones on the vehicle, one of a plurality of impact speeds, and one of a plurality of components that are selected by a user;

retrieving one of the plurality of impact simulations from the memory based on the one of the plurality of impact zones that the user selects on the 3D image of the vehicle and the one of the plurality of impact speeds selected by the user;

color-coding components in the 3D image of the vehicle to indicate a probability of damage based on the one of the plurality of impact simulations retrieved;

retrieving one of the plurality of instructions from the memory based on the one of the plurality of components that the user selects on the 3D image of the vehicle; and displaying a three-dimensional (3D) animation illustrating the one of the plurality of instructions using the electronic display.

2. The method of claim 1 wherein the impact simulation simulates an impact between an object and the vehicle.

3. The method of claim 1 further comprising generating audio using an electronic speaker to communicate the one of the plurality of instructions.

4. The method of claim 1 further comprising displaying text using the electronic display to communicate the one of the plurality of instructions.

5. The method of claim 1 further comprising displaying part numbers, part names, order information, and a tool list corresponding to the one of the plurality of instructions using the electronic display.

6. The method of claim 1 wherein the one of the plurality of instructions corresponds to a subassembly of the vehicle that the user selects on the 3D image of the vehicle.

7. The method of claim 1 wherein the 3D animation illustrates disassembling the component from the vehicle and assembling the component to the vehicle.

8. The method of claim 1 wherein the 3D image of the vehicle includes a holographic image.

9. The method of claim 1 further comprising displaying a three-dimensional (3D) animation illustrating the one of the plurality of impact simulations using the electronic display.

10. The method of claim 1 further comprising retrieving the one of the plurality of impact simulations based on one of a plurality of impact speeds selected by the user.

11. The method of claim 1 further comprising generating a parts list based on the probability of damage and displaying the parts list using the electronic display.

12. The method of claim 11 further comprising color-coding the parts list based on the probability of damage.

13. The method of claim 11, further comprising displaying order information for the parts list and ordering a part when the user selects the part from the parts list.

14. The method of claim 13, further comprising identifying parts in the parts list that are available at a repair facility that is selected by the user.

15. The method of claim 1 further comprising retrieving the one of the plurality of impact simulations based on an impact type that is selected by the user.

* * * * *